United States Patent [19]

Baum et al.

[11] Patent Number: 5,111,557
[45] Date of Patent: May 12, 1992

[54] METAL WELD STUD AND PLASTIC CLIP

[75] Inventors: Heinz O. Baum, Giessen-Allendorf; Johann Reindl, Biebertal, both of Fed. Rep. of Germany

[73] Assignee: Emhart Inc., Newark, Del.

[21] Appl. No.: 802,081

[22] Filed: Dec. 3, 1991

[51] Int. Cl.$^5$ .................... A44B 17/00; F16B 21/00
[52] U.S. Cl. ......................... 24/662; 24/297; 24/453; 411/510; 411/512; 411/913
[58] Field of Search .............. 24/662, 663, 453, 297, 24/563, 573.1; 411/508, 509, 510, 512, 913

[56] References Cited

U.S. PATENT DOCUMENTS

| | | | |
|---|---|---|---|
| 2,129,949 | 9/1938 | Lombard | 24/453 |
| 2,909,957 | 10/1959 | Rapata | 24/453 |
| 3,020,611 | 2/1962 | Perrochat | 24/297 |
| 3,063,114 | 11/1962 | Perrochat | 24/297 |
| 3,494,244 | 2/1970 | Wayland | 24/453 |
| 3,897,967 | 8/1975 | Barenyi | 24/297 |

FOREIGN PATENT DOCUMENTS

| | | | |
|---|---|---|---|
| 0855945 | 12/1960 | United Kingdom | 24/453 |
| 2179113 | 2/1987 | United Kingdom | 411/512 |

Primary Examiner—Victor N. Sakran
Attorney, Agent, or Firm—Spencer T. Smith

[57] ABSTRACT

The combination of a metal stud having a projecting head for welding to a receptor surface and a resilient clip for mounting on said stud and retained by said projecting head is characterized in that the underside of said head has a tapered shoulder which reduces progressively to the diameter of said stud, in that said clip has a retaining hole of which the internal diameter increases correspondingly from a diameter equal to that of the stud whereby it engages the tapered shoulder under said head when the clip is applied to the stud and in that said clip is provided with at least two retaining members which contact said receptor surface to urge the clip into close engagement with the tapered shoulder under the head of the stud.

The clip is easily mounted on the stud by direct pressure and provides a more positive location of the clip on the stud.

2 Claims, 1 Drawing Sheet

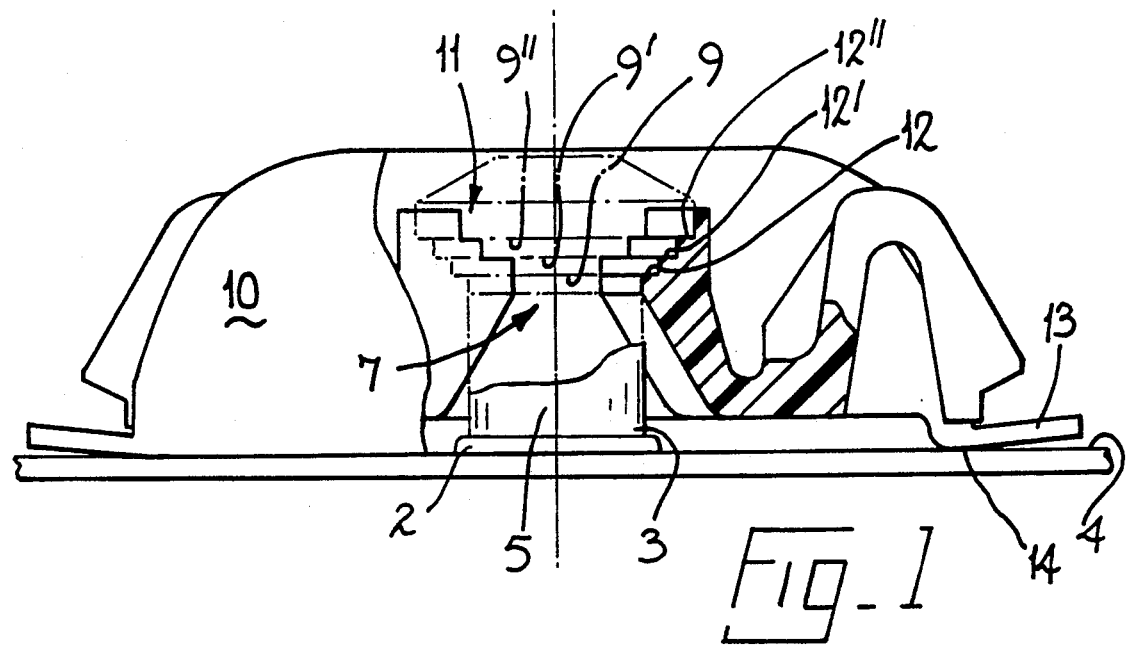
Fig_1
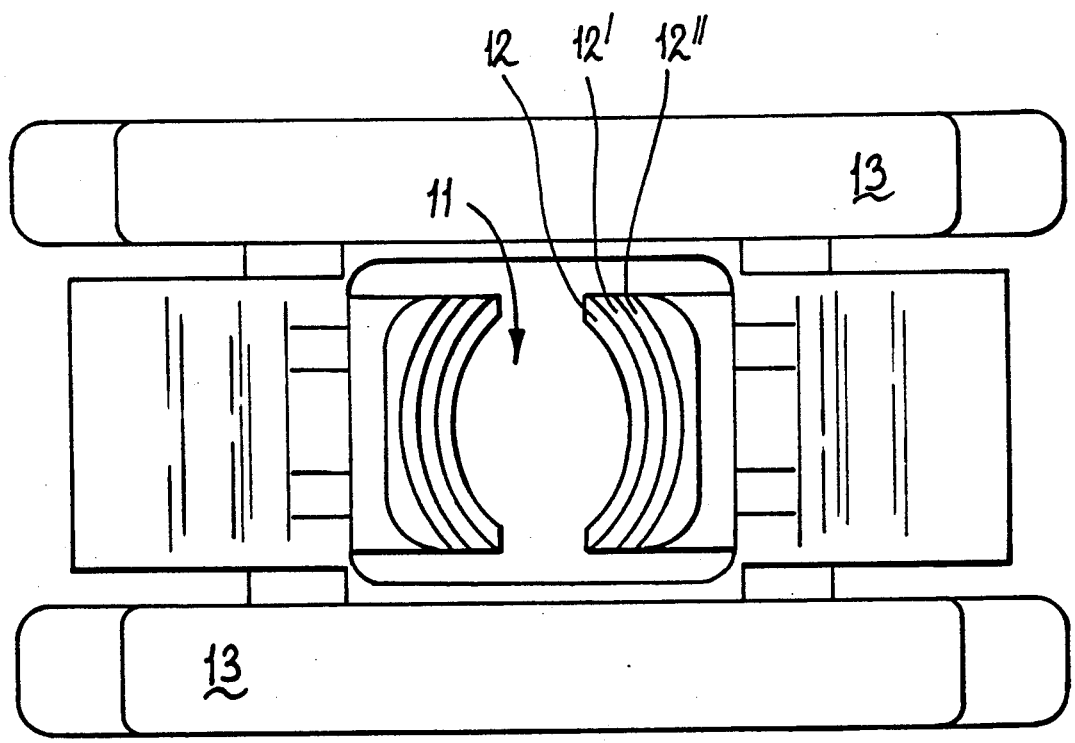
Fig_2

METAL WELD STUD AND PLASTIC CLIP

BACKGROUND OF THE INVENTION

The present invention relates to the combination of a metal weld stud having a projecting head for welding to a receptor surface together with a resilient clip for mounting on said head and retained by said projecting head.

The resilient clip is commonly formed of plastics material and is provided with a slightly undersized undercut opening which is forced over the projecting head and thus engages the projecting head to retain the clip on the stud.

It is an object of the present invention to provide such a stud-and-clip combination which permits the clip to be easily mounted on the stud by direct pressure and which provides a more positive location of the clip on the stud when it is welded to a receptor surface.

BRIEF DESCRIPTION OF THE INVENTION

According to the present invention, a metal stud having a projecting head for welding to a receptor surface and a resilient clip for mounting on said stud and retained by said projecting head is characterised in that the underside of said head has a tapered shoulder which reduces progressively to the diameter of said stud, in that said clip has a retaining hole of which the internal diameter increases correspondingly from a diameter equal to that of the stud whereby it engages the tapered shoulder under said head when the clip is applied to the stud and in that said clip is provided with at least two retaining members which contact said receptor surface to urge the clip into close engagement with the tapered shoulder under the head of the stud.

The clip is applied to the stud in an axial direction so that the longitudinal axes of the stud and of the clip are aligned.

In a preferred embodiment of the invention, said tapered shoulder reduces to the diameter of the stud in at least three steps and the retaining hole of the clip increases in corresponding steps from a internal diameter equal to the diameter of the stud whereby it engages the stepped shoulder under said head when the clip is applied.

The flexibility of the plastic clip and the height of the steps and their configuration provide a wide degree of tolerance of accommodating variations between the stud and the receptor surface.

In previously known stud-clips, the underside of the projecting head extends normally from the stud.

BRIEF DESCRIPTION OF THE DRAWINGS

In order that the invention can be better understood a preferred embodiment will now be described by way of example with reference to the accompanying drawings in which:

FIG. 1 is a part section a clip and stud according to the invention showing the stud mounted on the clip, and FIG. 2 is a plan view of the clip shown in FIG. 1.

DETAILED DESCRIPTION OF THE INVENTION

In the drawings, weld stud 3 is welded through zone 2 to receptor surface 4. Stud 3 has a cylindrical stem 5 and a projecting head 6 at its outward (with respect to the weld) end. The underside of projecting head 6 has a tapered shoulder 7 reducing progressively to the diameter of stem 5 of stud 3 by a series of three steps 9, 9', 9". Clip 10 has a mounting aperture 11, the inner surface of the aperture being formed as a series of steps 12, 12', 12" which correspond to the steps 9, 9', 9" of shoulder 7. Two resilient arms 13 extending from clip 10 contact receptor surface 4 at 14 and serve to urge the stepped surface of mounting aperture 11 into close contact with the stepped shoulder 7 of weld stud 3. This firmly locates clip 10 in position on stud 3 and obviates the possibility of sliding between the stud and clip.

The resilience of the plastics material from which clip 10 is formed enables the narrowest part, of aperture 11 to be forced over the widest part of head 6 and when the clip 10 is in position over head 6, the resilience of arms 13 pressing against receptor surface 4 urges the steps 12, 12', 12" of the clip into firm contact with the steps 9, 9', 9" of tapered shoulder 7.

We claim:

1. A metal stud having a projecting head for welding to a receptor surface and a resilient clip for mounting on said stud and retained by said projecting head characterised in that the underside of said head has a tapered shoulder which reduces progressively to the diameter of said stud, in that said clip has a retaining hole of which the internal diameter increases correspondingly from a diameter equal to that of the stud whereby it engages the tapered shoulder under said head when the clip is applied to the stud and in that said clip is provided with at least two retaining members which contact said receptor surface to urge the clip into close engagement with the tapered shoulder under the head of the stud.

2. A metal stud and a resilient clip according to claim 1, wherein said tapered shoulder reduces to the diameter of the stud in at least three steps and the retaining hole of the clip increases in corresponding steps from an internal diameter equal to the diameter of the stud whereby it engages the stepped shoulder under said head when the clip is applied.

* * * * *